(12) United States Patent
Horikawa et al.

(10) Patent No.: US 11,421,599 B2
(45) Date of Patent: Aug. 23, 2022

(54) GAS TURBINE COMBUSTOR AND OPERATING METHOD THEREOF

(71) Applicant: KAWASAKI JUKOGYO KABUSHIKI KAISHA, Kobe (JP)

(72) Inventors: Atsushi Horikawa, Akashi (JP); Masahide Kazari, Akashi (JP); Kunio Okada, Kakogawa (JP); Kazuki Koga, Nagoya (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 47 days.

(21) Appl. No.: 16/680,718

(22) Filed: Nov. 12, 2019

(65) Prior Publication Data

US 2020/0080480 A1 Mar. 12, 2020

Related U.S. Application Data

(63) Continuation of application No. PCT/JP2018/017549, filed on May 2, 2018.

(30) Foreign Application Priority Data

May 16, 2017 (JP) .............................. JP2017-096984

(51) Int. Cl.
*F02C 7/00* (2006.01)
*F02C 7/232* (2006.01)
(Continued)

(52) U.S. Cl.
CPC ............... *F02C 7/232* (2013.01); *F02C 9/40* (2013.01); *F23R 3/28* (2013.01); *F23R 3/346* (2013.01); *F23R 3/36* (2013.01)

(58) Field of Classification Search
CPC ...... F02C 3/20; F02C 3/22; F02C 9/40; F23R 3/36; F23R 3/346; F23R 3/343
See application file for complete search history.

(56) References Cited

U.S. PATENT DOCUMENTS 5,660,045 A * 8/1997 Ito ........................... F23D 23/00
60/737
7,921,651 B2 * 4/2011 Alexander ................ F02C 9/40
60/776

(Continued)

FOREIGN PATENT DOCUMENTS

| FR | 3 032 010 A1 | 7/2016 |
| JP | 2009-270574 A | 11/2009 |
| WO | 2015/182727 A1 | 12/2015 |

*Primary Examiner* — Katheryn A Malatek
(74) *Attorney, Agent, or Firm* — Sughrue Mion, PLLC (57) ABSTRACT

A gas turbine combustor including a fuel injector having a plurality of annular fuel injection portions in each of which multiple fuel injection holes are formed, is provided with: an auxiliary fuel introduction passage for introducing an auxiliary fuel that is to be supplied to an auxiliary fuel injection portion that is a part of the plurality of annular fuel injection portions, into the fuel injector; a first main fuel introduction passage provided with a flow regulating valve for introducing a main fuel that is to be supplied to a main fuel injection portion that is an annular fuel injection portion other than the auxiliary fuel injection portion, into the fuel injector; and a second main fuel introduction passage provided with a flow regulating valve for introducing the main fuel that is to be supplied to the auxiliary fuel injection portion, into the fuel injector.

2 Claims, 7 Drawing Sheets

(51) Int. Cl.
F23R 3/28 (2006.01)
F23R 3/36 (2006.01)
F02C 9/40 (2006.01)
F23R 3/34 (2006.01)

(56) References Cited

U.S. PATENT DOCUMENTS

2009/0272118 A1 11/2009 Alexander et al.
2012/0258409 A1 10/2012 Mansour et al.
2013/0186057 A1* 7/2013 Shanmugam ............. F02C 3/20
60/39.463
2017/0074521 A1* 3/2017 Horikawa ............... F02C 7/232

* cited by examiner

GAS TURBINE COMBUSTOR AND OPERATING METHOD THEREOF

CROSS REFERENCE TO THE RELATED APPLICATION

This application is a continuation application, under 35 U.S.C. § 111(a), of international application No. PCT/JP2018/017549, filed May 2, 2018, which claims priority to Japanese patent application No. 2017-096984, filed May 16, 2017, the disclosure of which are incorporated by reference in their entirety into this application.

BACKGROUND OF THE INVENTION

Field of the Invention

The present invention relates to a combustor for use in a gas turbine engine and an operating method thereof.

Description of Related Art

In recent years, to realize a so-called low-carbon society, a gas turbine engine that uses hydrogen as fuel has been proposed. However, with fuel having high reactivity such as fuel containing hydrogen, the combustion temperature is high, and thus NOx is likely to be generated, so that it is necessary to inhibit generation of NOx.

As a technique to achieve low-NOx combustion while using gas having high reactivity such as hydrogen as fuel, inhibiting local occurrence of high-temperature combustion by injecting fuel in a distributed manner from multiple fuel injection holes has been proposed (see, for example, Patent Document 1).

RELATED DOCUMENT

Patent Document

[Patent Document 1] US Patent Application Publication No. 2012/0258409

SUMMARY OF THE INVENTION

With fuel having a high reaction rate and a wide combustible concentration range such as hydrogen fuel, however, when an ignition failure occurs at startup of an engine, combustible gas (mixed gas of hydrogen and air) may be abnormally combusted in an engine body and a flue. In addition, in the case of injecting fuel in a distributed manner from multiple injection holes as described above, since a volume flow rate of gas containing hydrogen is high, a fuel supply distribution is likely to be made non-uniform at startup or stop of the engine and during low-load operation, that is, when the volume flow rate of fuel gas injected into a combustor is low, and thus unburned gas is still likely to be generated.

Therefore, an object of the present invention is to, in a combustor of a gas turbine engine using fuel having high reactivity, prevent generation of unburned gas and maintain stable operation even at startup or stop of the engine while achieving low-NOx combustion, in order to solve the above-described problem.

In order to solve the above-described problem, a gas turbine combustor according to the present invention includes:

a combustion liner forming a combustion chamber therein;

a fuel injector provided at a top portion of the combustion liner and having a plurality of annular fuel injection portions arranged so as to be concentric with each other, each annular fuel injection portion being formed with multiple fuel injection holes arranged in a circumferential direction;

an igniter configured to ignite a fuel injected from the fuel injector into the combustion chamber;

an auxiliary fuel introduction passage configured to introduce an auxiliary fuel that is to be supplied to an auxiliary fuel injection portion that is a part of the plurality of annular fuel injection portions, into the fuel injector;

a first main fuel introduction passage configured to introduce a main fuel that is to be supplied to a main fuel injection portion that is an annular fuel injection portion other than the auxiliary fuel injection portion among the plurality of annular fuel injection portions, into the fuel injector, the first main fuel introduction passage being provided with a first flow regulating valve; and a second main fuel introduction passage configured to introduce a main fuel that is to be supplied to the auxiliary fuel injection portion, into the fuel injector, the second main fuel introduction passage being provided with a second flow regulating valve.

The main fuel may be, for example, a hydrogen-containing gas, and the auxiliary fuel is, for example, a natural gas.

According to this configuration, since a fuel is injected in a distributed manner from the fuel injection holes of the plurality of annular fuel injection portions, local occurrence of a portion where the temperature is high can be avoided and low-NOx combustion can be achieved even when fuel having high reactivity is used as the main fuel. Furthermore, since injection of the auxiliary fuel is enabled by connecting the auxiliary fuel introduction passage to a part of the plurality of annular fuel injection portions, stable combustion can be achieved even at startup or stop of the combustor, at which the combustor is in a low-load state, by supplying fuel having lower reactivity than the main fuel as the auxiliary fuel. Therefore, stable operation of the combustor and stable engine operation can be maintained while generation of unburned gas and a problem due to generation of unburned gas are suppressed.

According to one embodiment of the present invention, the combustor may further include a common fuel supply passage configured to supply the auxiliary fuel and the main fuel to the auxiliary fuel injection portion, and the auxiliary fuel introduction passage and the second main fuel introduction passage may be connected to the common fuel supply passage. According to this configuration, since supply of the auxiliary fuel and the main fuel from the common fuel supply passage to the auxiliary fuel injection portion is enabled, the structure of the fuel injector can be simplified.

According to one embodiment of the present invention, in the combustor, the igniter may be attached to the combustion liner, and the auxiliary fuel injection portion may be disposed at the radially outermost side among the plurality of annular fuel injection portions. According to this configuration, since the auxiliary fuel injection portion is disposed in the vicinity of the igniter, the auxiliary fuel can be assuredly ignited.

According to one embodiment of the present invention, the combustor may further include a purge gas introduction passage configured to introduce a purge gas into the first main fuel introduction passage and the second main fuel introduction passage. The combustor may further include an additional purge gas introduction passage branching from the auxiliary fuel introduction passage and configured to introduce the auxiliary fuel as a purge gas into the first main fuel introduction passage and the second main fuel introduction passage. According to this configuration, during stopping of the combustor, the main fuel passages can be purged using the dedicated purge gas or the auxiliary fuel while the main fuel is being combusted, and thus unburned gas or combustible gas can be prevented from remaining in the combustor and a fuel supply pipe after the stop.

An operating method of a gas turbine engine combustor according to a first aspect of the present invention is an operating method at startup of the combustor and includes the steps of:

injecting the auxiliary fuel from the auxiliary fuel introduction passage through the auxiliary fuel injection portion into the combustion chamber to thereby ignite the auxiliary fuel at startup;

injecting the main fuel from the first main fuel introduction passage through the main fuel injection portion into the combustion chamber while gradually increasing a flow rate of the main fuel using the first flow regulating valve, after the auxiliary fuel is ignited; and stopping introduction of the auxiliary fuel from the auxiliary fuel introduction passage after the main fuel is ignited.

According to this configuration, since the auxiliary fuel is injected from the part of the plurality of annular fuel injection portions through the auxiliary fuel introduction passage, stable combustion can be achieved even at startup of the combustor, at which the combustor is in a low-load state, by supplying fuel having lower reactivity than the main fuel as the auxiliary fuel. Therefore, stable operation of the combustor and stable engine operation can be maintained while generation of unburned gas and a problem due to generation of unburned gas are suppressed.

In an embodiment of the operating method according to the present invention, the operating method may further include the step of injecting the main fuel from the second main fuel introduction passage through the auxiliary fuel injection portion into the combustion chamber while gradually increasing a flow rate of the main fuel using the second flow regulating valve, after the introduction of the auxiliary fuel from the auxiliary fuel introduction passage is stopped. According to this configuration, staging combustion in which the number of annular fuel injection portions to be operated is increased in accordance with an increase in load is enabled by using the structure of the combustor including the plurality of annular fuel injection portions.

An operating method of a gas turbine engine combustor according to a second aspect of the present invention is an operating method during stopping of the combustor and includes the steps of:

stopping introduction of the main fuel from the second fuel introduction passage into the auxiliary fuel injection portion in a high-load operation state in which the main fuel injected from the plurality of annular fuel injection portions into the combustion chamber is being combusted;

injecting the auxiliary fuel from the auxiliary fuel introduction passage through the auxiliary fuel injection portion into the combustion chamber after the introduction of the main fuel into the auxiliary fuel injection portion is stopped;

stopping introduction of the main fuel from the first main fuel introduction passage after the auxiliary fuel is ignited; and stopping supply of the auxiliary fuel from the auxiliary fuel introduction passage after the introduction of the main fuel from the first main fuel supply passage is stopped.

In the case of performing stop in a low-load operation state in which the main fuel is not injected from the auxiliary fuel injection portion, the stop is performed through the steps subsequent to the step of injecting the auxiliary fuel from the auxiliary fuel introduction passage into the combustion chamber.

In the present specification, the terms "during stopping" is used to mean during decelerating operation toward stop of the combustor.

According to this configuration, after stable combustion in a low-load state is ensured by injecting the auxiliary fuel through the auxiliary fuel introduction passage during stopping, supply of the main fuel is stopped and then injection of the auxiliary fuel is stopped. Thus, unburned gas of the main fuel having a high reaction rate and a wide combustible concentration range can be effectively prevented from remaining after the stop.

According to one embodiment of the present invention, in the case where the combustor includes the purge gas introduction passage, the operating method may further include the steps of: introducing the purge gas from the purge gas introduction passage into the first main fuel introduction passage and the second main fuel introduction passage after supply of the main fuel from the first main fuel introduction passage is stopped; and combusting the main fuel discharged from the first main fuel introduction passage and the second main fuel introduction passage into the combustion chamber by the introduction of the purge gas, together with the auxiliary fuel from the auxiliary fuel introduction passage.

According to one embodiment of the present invention, in the case where the combustor includes the purge gas introduction passage and the additional purge gas introduction passage, the operating method may further include the step of introducing the auxiliary fuel from the additional purge gas introduction passage into the first main fuel introduction passage and the second main fuel introduction passage after the main fuel is discharged from the first main fuel introduction passage and the second main fuel introduction passage into the combustion chamber by the introduction of the purge gas.

Additional purge gas may be introduced directly without introduction of the purge gas.

According to this configuration, during stopping of the combustor, the main fuel passages are purged using the dedicated purge gas or the auxiliary fuel while the main fuel is being combusted, and thus unburned gas of the main fuel having a high reaction rate and a wide combustible concentration range can be prevented from remaining in the combustor and a fuel supply pipe after the stop.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Hereinafter, embodiments of the present invention will be described with reference to the drawings, but the present invention is not limited to the embodiments.

Figure 1:
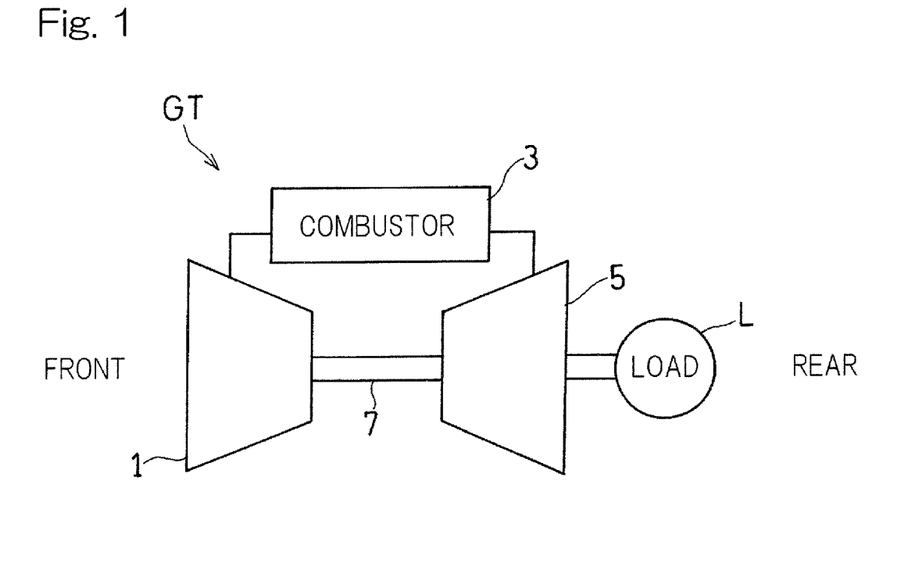
FIG. 1 is a block diagram showing a schematic configuration of a gas turbine engine to which a fuel injector according to one embodiment of the present invention is applied.

FIG. 1 shows a schematic configuration of a gas turbine engine (hereinafter, simply referred to as a gas turbine) GT to which a combustor according to one embodiment of the present invention is applied. In the gas turbine GT, an air which has been introduced thereinto is compressed by a compressor 1 and guided into a combustor 3, a fuel is injected into the combustor 3 and combusted, and a turbine 5 is driven by the obtained high-temperature and high-pressure combustion gas G The combustor 3 is, for example, a can-type combustor, and a plurality of such combustors are disposed annularly about the axis of the gas turbine GT. The turbine 5 is coupled to the compressor 1 via a rotation shaft 7, and the compressor 1 is driven by the turbine 5. By output of the gas turbine GT, a load L such as a rotor of an aircraft or a generator is driven. In the following description, the compressor 1 side and the turbine 5 side in the axial direction of the gas turbine GT are referred to as "front side" and "rear side", respectively.

Figure 2:
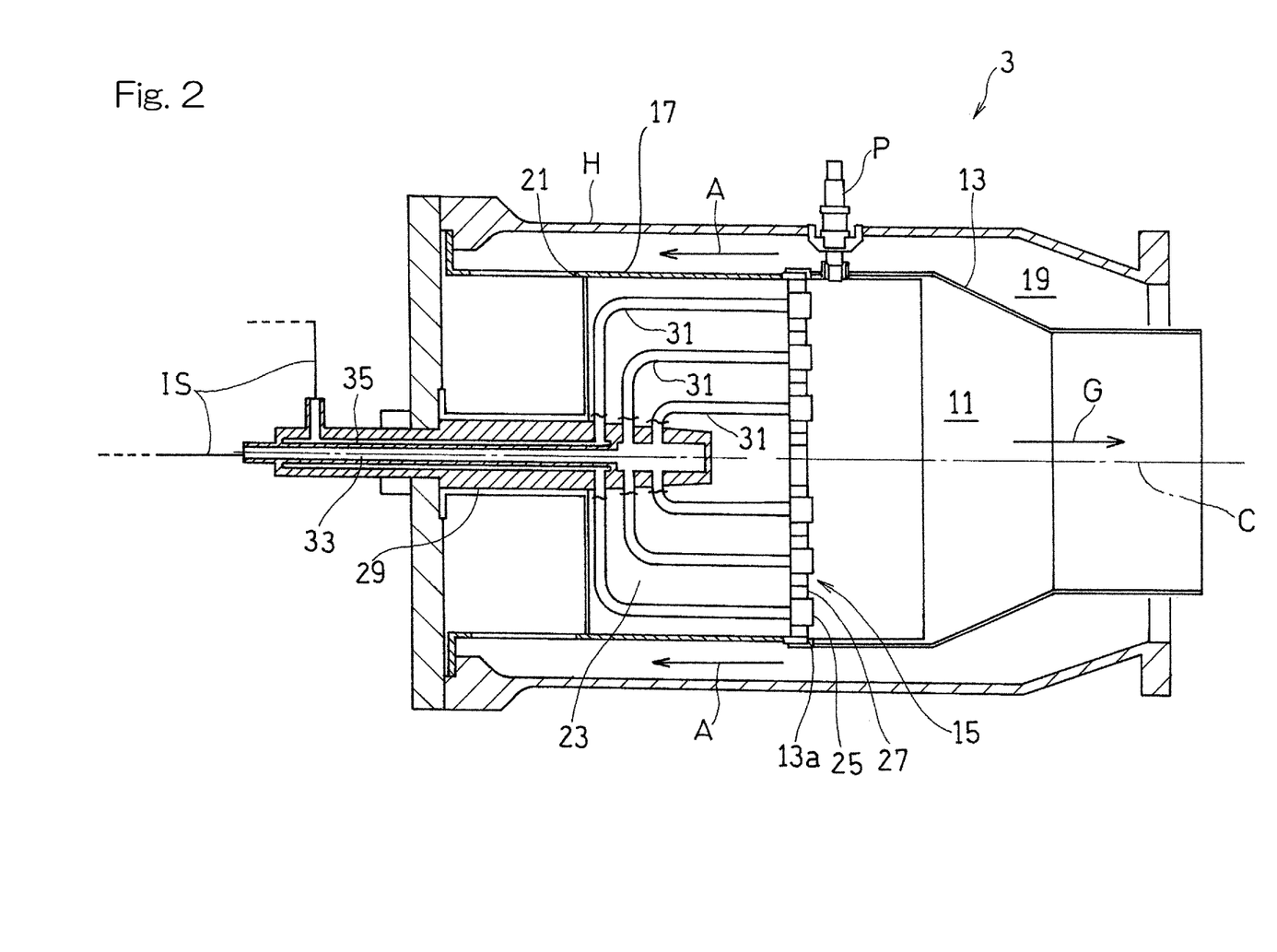
FIG. 2 is a cross-sectional view showing a combustor according to the embodiment of the present invention.

As shown in FIG. 2, the combustor 3 includes: a combustion liner 13 that forms a combustion chamber 11 therein; a fuel injector 15 that is provided at a top portion (most upstream portion) 13a of the combustion liner 13 and injects a fuel and an air into the combustion chamber 11; and a fuel supply system IS that introduces the fuel into the fuel injector 15. By igniting the fuel and the air injected from the fuel injector 15, using an igniter P that is provided to the combustion liner 13, flame is formed within the combustion chamber 11. The combustion liner 13 and the fuel injector 15 are concentrically housed in a substantially cylindrical housing H that is an outer tube of the combustor 3.

In the present embodiment, the combustor 3 is configured as a reverse-flow type in which the flow direction of air A and the flow direction of the combustion gas G are opposite to each other. That is, the combustor 3 has an air introduction passage 19 formed between the housing H and the combustion liner 13 and a support tube 17 that extends frontward from the combustion liner 13 in a tubular shape. The air introduction passage 19 introduces the air A compressed by the compressor 1 (FIG. 1), in the direction opposite to the flow direction of the combustion gas G within the combustion chamber 11. The combustor 3 may be of an axial-flow type in which the flow directions of the air A and the combustion gas G are the same. A plurality of air introduction holes 21 are provided in a front-end portion of a peripheral wall of the support tube 17 so as to be aligned in the circumferential direction. The air A supplied through the air introduction passage 19 is introduced through the air introduction holes 21 into an air supply passage 23 formed inside the support tube 17, and supplied to the rear side, that is, in the direction toward the combustion chamber 11.

Figure 3:
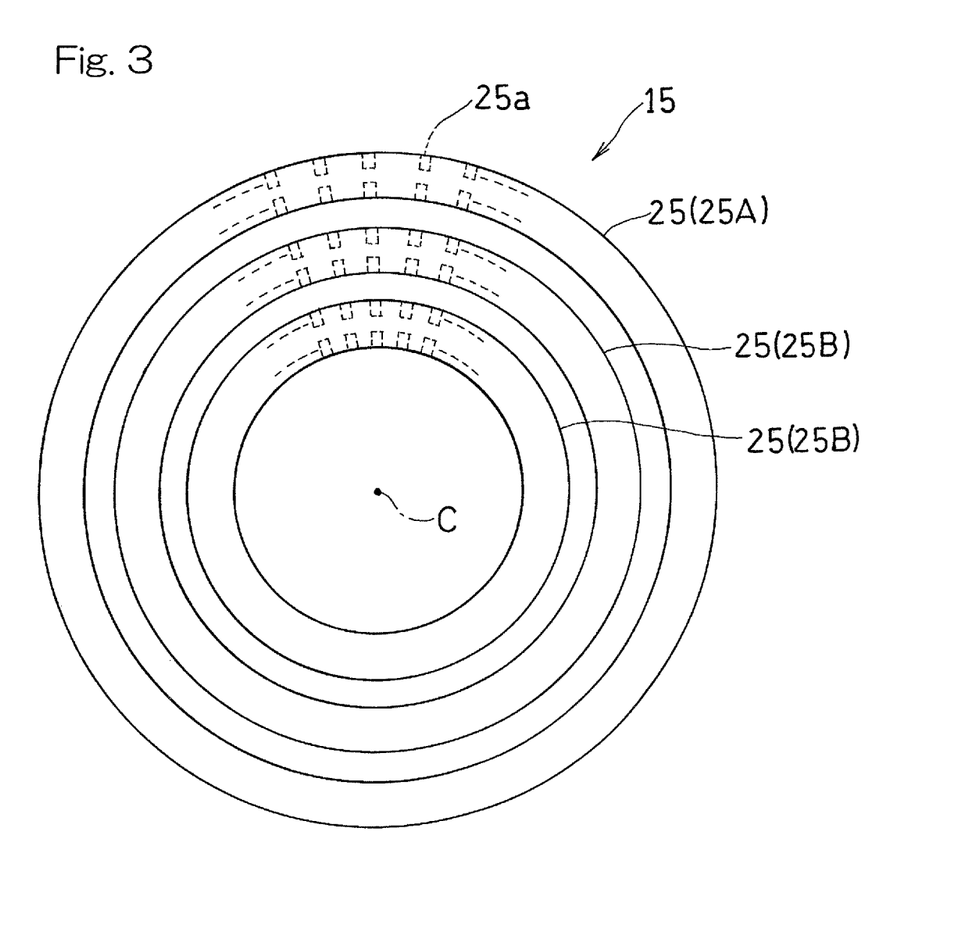
FIG. 3 is a front view showing an example of a fuel injector used in the combustor in FIG. 2.

As shown in FIG. 3, the fuel injector 15 includes a plurality of annular fuel injection portions 25. In the present embodiment, three annular fuel injection portions 25 having diameter dimensions different from each other are arranged so as to be concentric with each other and be concentric with the combustor 3 (FIG. 2). Multiple fuel injection holes 25a are formed in each annular fuel injection portion 25 so as to be arranged at regular intervals in the circumferential direction thereof. As shown in FIG. 2, for example, air guides 27 for guiding the air A from the air supply passage 23 to mix the air and the fuel injected from the annular fuel injection portions 25 are disposed radially outward and inward of the respective annular fuel injection portions 25. The fuel injected from the respective annular fuel injection portions 25 is premixed with the air guided by the air guides 27, and injected as premixed gas into the combustion chamber 11. The number of annular fuel injection portions 25 is not particularly limited as long as the number is not less than two.

Next, a specific fuel supply structure in the fuel injector 15 of the combustor 3 will be described. The combustor 3 of the present embodiment has a plurality of fuel supply passages capable of supplying fuel F to the respective annular fuel injection portions 25 of the fuel injector 15. A fuel supply main pipe 29 is provided in the fuel injector 15 so as to extend from a center portion of the air supply passage 23 to the rear side of the housing H. The fuel supply main pipe 29 and the respective annular fuel injection portions 25 are connected to each other by fuel supply branch pipes 31 that branch from the fuel supply main pipe 29 independently of each other. The fuel supply main pipe 29 has a multi-pipe structure (double-pipe structure) in which two cylindrical pipes are concentrically disposed in layers. The internal space of the inner fuel supply pipe and the internal spaces of the fuel supply branch pipes 31 that communicate therewith form a first fuel supply passage 33, and the space between the inner and outer fuel supply pipes and the internal space of the fuel supply branch pipe 31 that communicates therewith form a second fuel supply passage 35. A fuel is introduced from a fuel introduction system IS, which will be described later, into the respective fuel supply passages 33 and 35 within the fuel supply main pipe 29.

In the present embodiment, the fuel that has passed through the first fuel supply passage 33 is supplied to the two annular fuel injection portions 25 disposed at the radially inner side among the plurality of annular fuel injection portions 25. The fuel F that has passed through the second fuel supply passage 35 is supplied through the one fuel supply branch pipe 31 connected to the second fuel supply passage 35, to the one annular fuel injection portion 25 disposed at the radially outermost side among the plurality of annular fuel injection portions 25.

The multi-pipe structure of the fuel supply main pipe 29 is not limited to the example in FIG. 2, as long as a plurality of fuel supply passages that are independent from each other can be formed using a plurality of pipes. For example, the multi-pipe structure of the fuel supply main pipe 29 may be a multi-pipe structure in which, within one header having a large diameter, a plurality of fuel supply pipes having diameters that are smaller than that of the header and are equal to each other are provided so as to extend parallel to each other.

By employing such a fuel supply structure, a staging combustion can be achieved, in which a change in output of the gas turbine GT from a low load (partial load) to a high load (rated load) is suitably handled by dividing the annular fuel injection portions 25 into annular fuel injection portions 25 that perform fuel supply and the remaining annular fuel injection portions 25 that do not perform fuel supply. In the case of injecting fuel in a distributed manner through the multiple fuel injection holes 25a of the plurality of annular fuel injection portions 25 of the fuel injector 15 as in the present embodiment, handling load fluctuations by selecting annular fuel injection portions 25 that are operated and the remaining annular fuel injection portions 25 that are not operated is effective for stable low-NOx combustion, rather than by uniformly changing fuel supply amounts at all the annular fuel injection portions 25.

Figure 4:
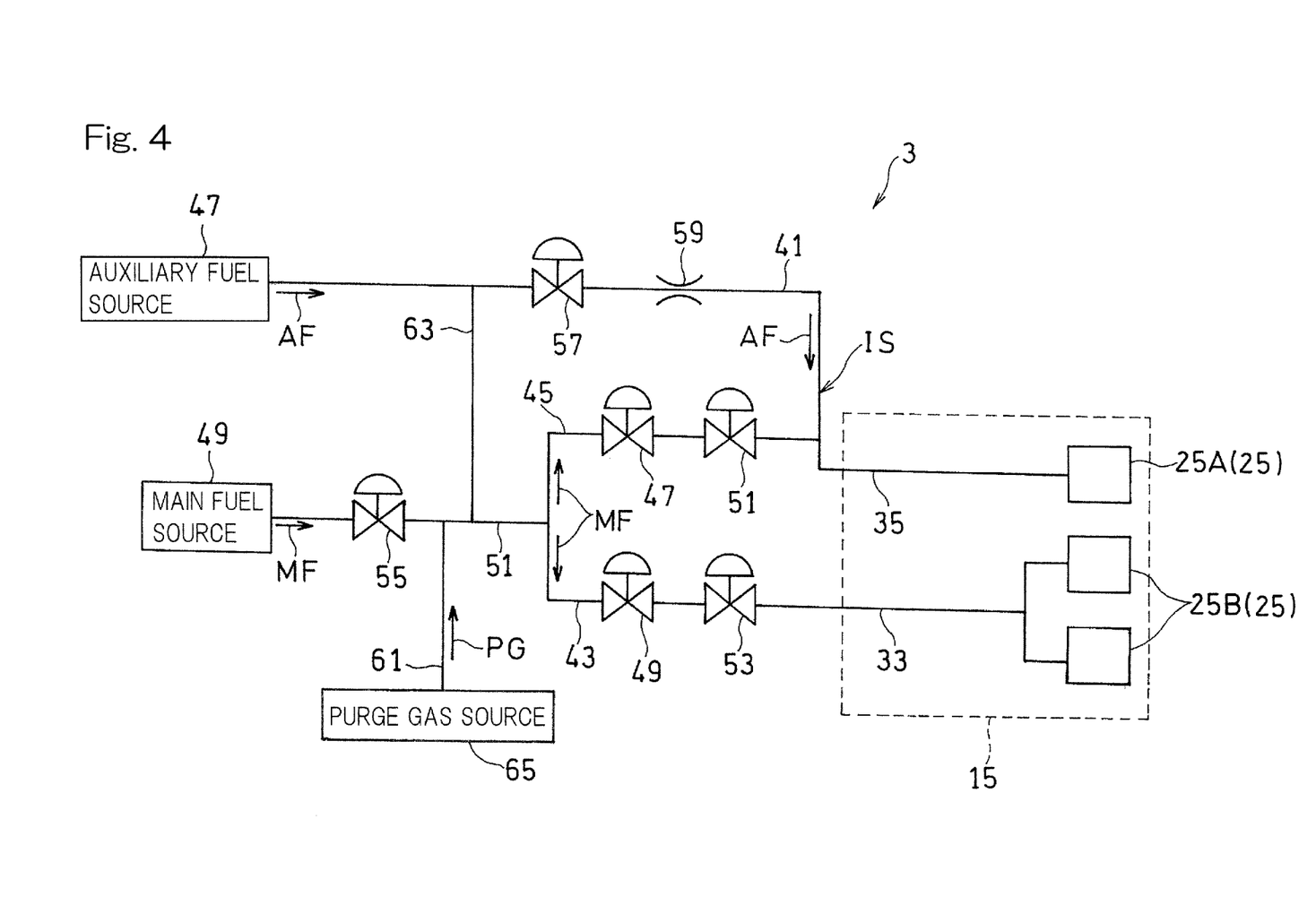
FIG. 4 is a block diagram schematically showing an example of a fuel introduction system used in the combustor in FIG. 2.

Next, the configuration of the fuel introduction system IS that introduces the fuel into the fuel injector 15 having such a structure will be described. As shown in FIG. 4, in the present embodiment, the fuel introduction system IS includes an auxiliary fuel introduction passage 41, a first main fuel introduction passage 43, and a second main fuel introduction passage 45. The auxiliary fuel introduction passage 41 introduces an auxiliary fuel AF from an auxiliary fuel source 47 into the fuel injector 15. The first main fuel introduction passage 43 and the second main fuel introduction passage 45 introduce a main fuel from a main fuel source 49 into the fuel injector 15. In the shown example, the first main fuel introduction passage 43 and the second main fuel introduction passage 45 are connected to a common main fuel major passage 51 connected to the common main fuel source 49. In other words, the first main fuel introduction passage 43 and the second main fuel introduction passage 45 are provided so as to branch from the downstream end of the main fuel major passage 51. The first main fuel introduction passage 43 and the second main fuel introduction passage 45 may be independently connected to separately-provided main fuel sources, respectively.

The auxiliary fuel introduction passage 41 introduces the auxiliary fuel AF that is to be supplied to the annular fuel injection portion 25 disposed at the radially outermost side (hereinafter, referred to as "auxiliary fuel injection portion 25A") among the plurality of annular fuel injection portions 25, into the fuel injector 15. The first main fuel introduction passage 43 introduces the main fuel MF that is to be supplied to the annular fuel injection portions 25 other than the auxiliary fuel injection portion 25A, that is, the two annular fuel injection portions 25 disposed at the radially inner side (hereinafter, referred to as main fuel injection portions 25B) among the plurality of annular fuel injection portions 25, into the fuel injector 15. The second main fuel introduction passage 45 introduces the main fuel MF that is to be supplied to the auxiliary fuel injection portion 25A, into the fuel injector 15. That is, in the present embodiment, the auxiliary fuel introduction passage 41 and the second main fuel introduction passage 45 are connected to the second fuel supply passage 35 of the fuel injector 15, and the second fuel supply passage 35 is formed as a common fuel supply passage that serves as a supply passage for supplying the auxiliary fuel AF to the auxiliary fuel injection portion 25A and a supply passage for supplying the main fuel MF to the auxiliary fuel injection portion 25A. In addition, the first main fuel introduction passage 43 is connected to the first fuel supply passage 33 of the fuel injector 15, and the main fuel MF is supplied through the first fuel supply passage 33 to the two main fuel injection portions 25B.

In the present embodiment, as shown in FIG. 2, the igniter P is attached to the combustion liner 13, and the auxiliary fuel injection portion 25A is disposed at the radially outermost side among the plurality of annular fuel injection portions 25. Thus, the auxiliary fuel injection portion 25A is located near the igniter P, and the auxiliary fuel can be assuredly ignited. However, the arrangement of the igniter P and the auxiliary fuel injection portion 25A is not limited to this example. For example, in the case where the igniter is disposed on the axis C of the combustor 3, the annular fuel injection portion disposed at the radially innermost side among the plurality of annular fuel injection portions 25 may be formed as the auxiliary fuel injection portion 25A (that is, may be configured to be supplied with the auxiliary fuel AF from the auxiliary fuel introduction passage 41 and be supplied with the main fuel MF from the second main fuel introduction passage 45). In addition, the auxiliary fuel injection portion 25A does not need to be disposed in the vicinity of the igniter P. Moreover, the number of auxiliary fuel injection portions 25A is not limited to one, and may be two or more, as long as not all of the plurality of annular fuel injection portions 25 are auxiliary fuel injection portions 25A.

The main fuel MF is fuel having high reactivity and a wide combustible concentration range. In the present embodiment, the main fuel MF is hydrogen-containing gas, for example, hydrogen gas. The auxiliary fuel AF is fuel having lower reactivity and a narrower combustible concentration range than the main fuel MF, and may be used not only at startup of the combustor but also at the time of a low load such as during stopping of the combustor as described later. In the present embodiment, the auxiliary fuel AF is natural gas. As the auxiliary fuel AF, in addition to natural gas, for example, hydrocarbon fuel gas such as propane may be used.

As shown in FIG. 4, on-off valves (a first on-off valve 47 and a second on-off valve 49) are provided on upstream portions of the first main fuel introduction passage 43 and the second main fuel introduction passage 45, respectively, and flow regulating valves (a first flow regulating valve 51 and a second flow regulating valve 53) are provided downstream of the on-off valves 47 and 49, respectively. An on-off valve (third on-off valve 55) is provided on the main fuel major passage 51. In addition, an on-off valve (fourth on-off valve 57) is provided on an upstream portion of the auxiliary fuel introduction passage 41, and an orifice 59 for flow limitation is provided downstream of the fourth on-off valve 57.

Furthermore, the fuel introduction system IS includes a purge gas introduction passage 61 that introduces a purge gas PG into the first main fuel introduction passage 43 and the second main fuel introduction passage 45. In the present embodiment in which the first main fuel introduction passage 43 and the second main fuel introduction passage 45 branch from the main fuel major passage 51, the purge gas introduction passage 61 is connected to a portion of the main fuel major passage 51 downstream of the third on-off valve 55. In addition, the fuel introduction system IS includes an additional purge gas introduction passage 63 that branches from the auxiliary fuel introduction passage 41 and introduces the auxiliary fuel AF as a purge gas into the first main fuel introduction passage 43 and the second main fuel introduction passage 45. In the present embodiment, the additional purge gas introduction passage 63 is also connected to the portion of the main fuel major passage 51 downstream of the third on-off valve 55.

As the purge gas PG, for example, nitrogen gas having very low reactivity, inert gas, or the like may be used. The purge gas PG is supplied from a purge gas source 65 connected to the purge gas introduction passage 61.

Next, an operating method of the combustor 3 configured as described above will be described. First, an operating method at startup of the combustor 3 will be described.

Figure 5:
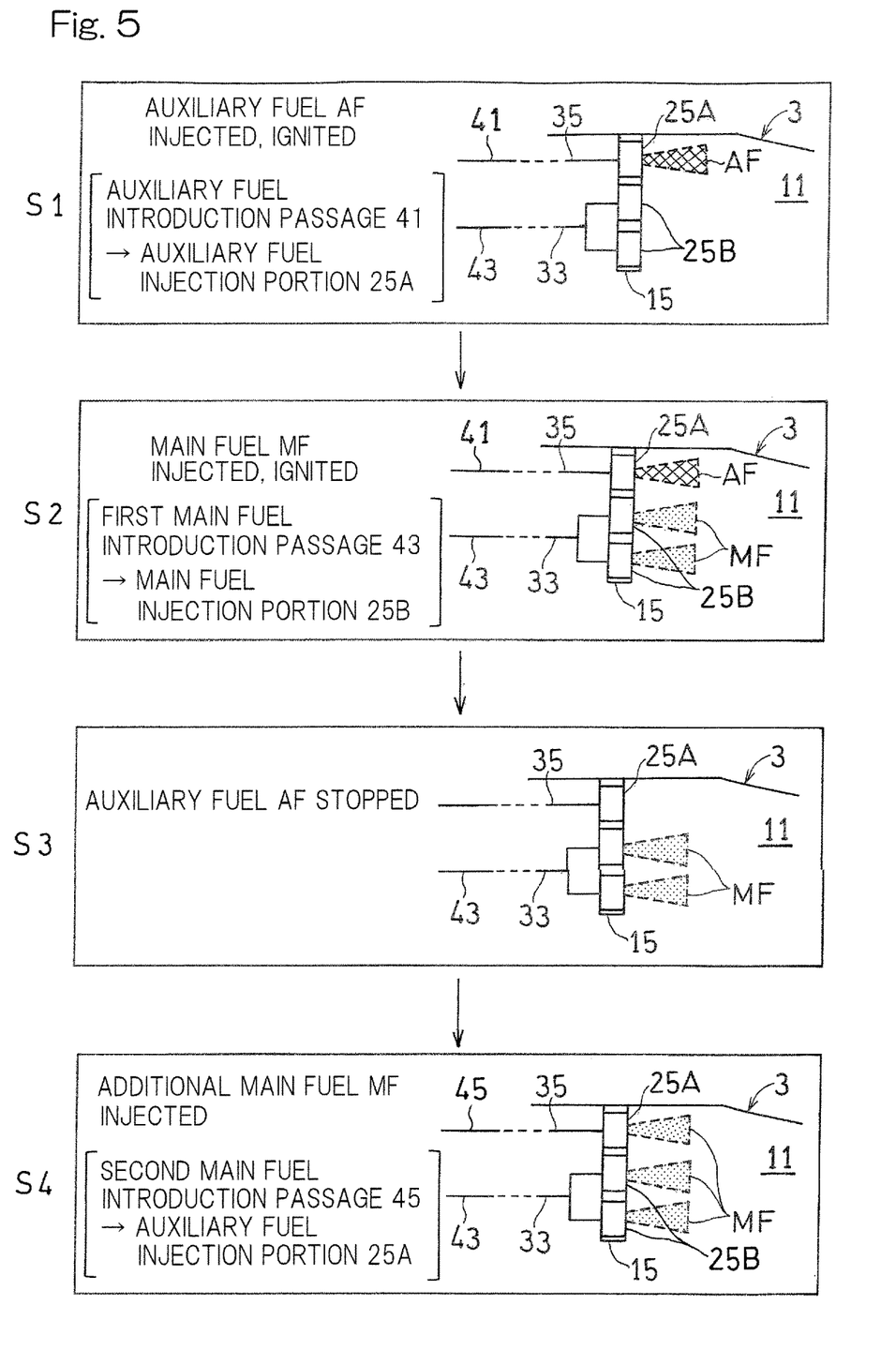
FIG. 5 is a flowchart showing an example of an operating method at startup of the combustor in FIG. 2.

As shown in FIG. 5, at startup of the combustor 3, first, the auxiliary fuel AF is injected from the auxiliary fuel introduction passage 41 through the second fuel supply passage 35 and the auxiliary fuel injection portion 25A into the combustion chamber 11, and the auxiliary fuel AF injected into the combustion chamber 11 is ignited by the igniter P (FIG. 2) (auxiliary fuel ignition step S1). After the auxiliary fuel AF is ignited, the main fuel MF is injected from the first main fuel introduction passage 43 through the main fuel injection portions 25B into the combustion chamber 11 while the flow rate of the main fuel MF is gradually increased by the first flow regulating valve 51 (FIG. 4) (main fuel injection step S2). After the main fuel MF is ignited, the introduction of the auxiliary fuel AF from the auxiliary fuel introduction passage 41 is stopped (auxiliary fuel stop step S3).

In the case of performing operation at a load lower than that of the rated operation of the gas turbine in which the combustor 3 is used (in a low-load operation state), the operation is continued in this state.

In the case of performing an operation at a load higher than that in the low-load operation state, for example, the rated operation of the gas turbine (in a high-load operation state), after the auxiliary fuel stop step S3, an additional main fuel MF is injected from the second main fuel introduction passage 45 through the auxiliary fuel injection portion 25A into the combustion chamber 11 while the flow rate of the main fuel MF is gradually increased by the second flow regulating valve 53 (FIG. 4) (additional main fuel injection step S4).

Figure 6:
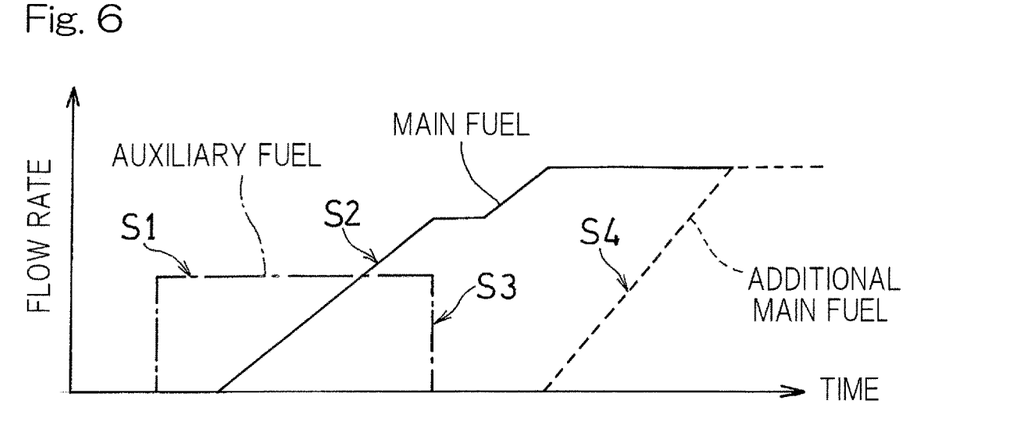
FIG. 6 is a graph schematically showing an example of a fuel flow rate profile by the operating method in FIG. 5.
Figure 7:
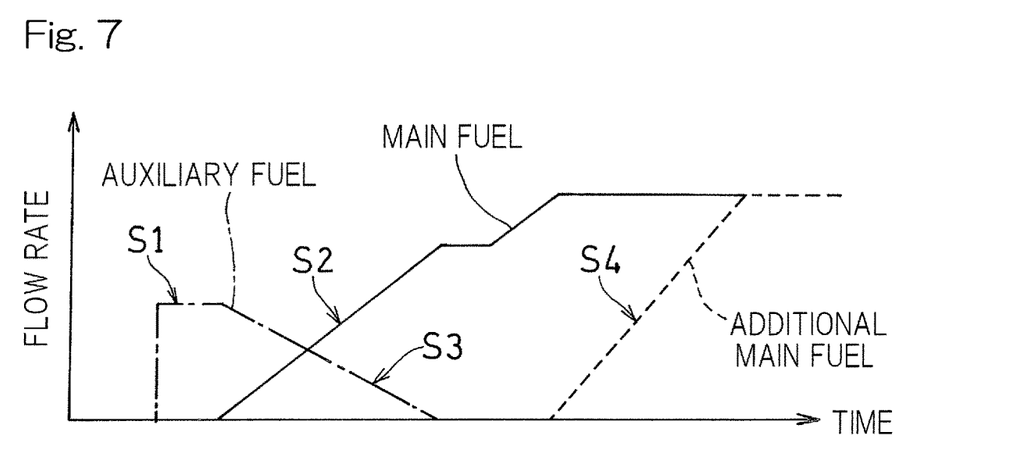
FIG. 7 is a graph schematically showing another example of the fuel flow rate profile by the operating method in FIG. 5.
Figure 8:
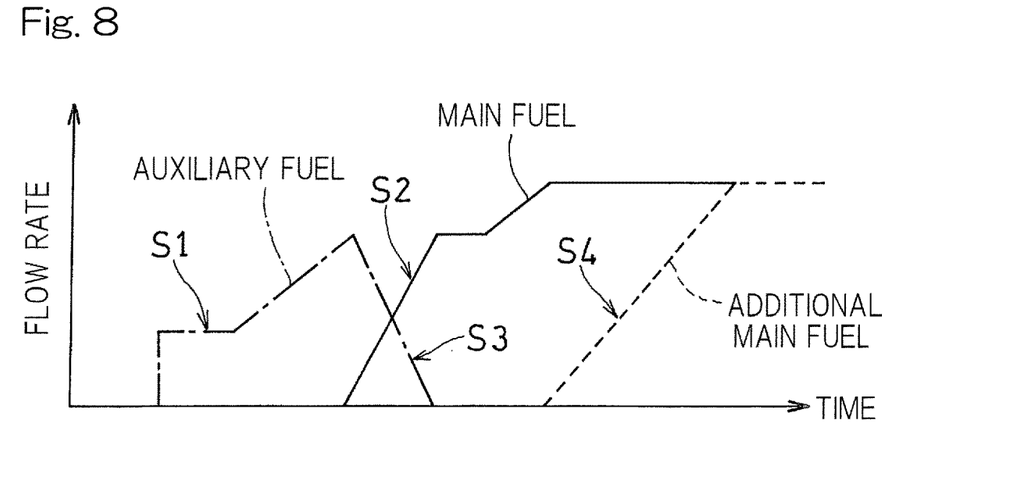
FIG. 8 is a graph schematically showing still another example of the fuel flow rate profile by the operating method in FIG. 5.

FIG. 6 shows a profile of a fuel flow rate in the case of operating the combustor 3 by the method described above. In FIG. 6, the horizontal axis represents time, and the vertical axis represents fuel flow rate. In addition, an alternate long and short dash line represents the flow rate of the auxiliary fuel AF passing through the auxiliary fuel introduction passage 41, a solid line represents the flow rate of the main fuel MF passing through the first main fuel introduction passage 43, and a broken line represents the flow rate of the additional main fuel MF passing through the second main fuel introduction passage 45. In the present embodiment, the example in which a flow regulating valve is not provided on the auxiliary fuel introduction passage 41 and control of whether or not to cause the auxiliary fuel AF to flow to the auxiliary fuel introduction passage 41 at a predetermined flow rate is enabled by a combination of the fourth on-off valve 57 and the orifice 59, is shown. However, the example of the operating method through the auxiliary fuel introduction passage 41 is not limited thereto. For example, a flow regulating valve may be provided downstream of the fourth on-off valve 57 on the auxiliary fuel introduction passage 41, and introduction of the auxiliary fuel AF in the auxiliary fuel ignition step S1 or stop of the introduction of the auxiliary fuel AF in the auxiliary fuel stop step S3 may be performed while the flow rate of the auxiliary fuel AF is regulated. In this case, for example, as shown in FIG. 7, in the auxiliary fuel stop step S3, the introduction of the auxiliary fuel AF may be stopped in such a way that the flow rate of the auxiliary fuel AF is gradually decreased from the time point of start of injection of the main fuel MF. Alternatively, as shown in FIG. 8, after the flow rate of the auxiliary fuel AF is gradually increased in the auxiliary fuel ignition step S1, the introduction of the auxiliary fuel AF may be stopped in such a way that the flow rate of the auxiliary fuel AF is gradually decreased from the time point of start of injection of the main fuel MF in the auxiliary fuel stop step S3.

Figure 9:
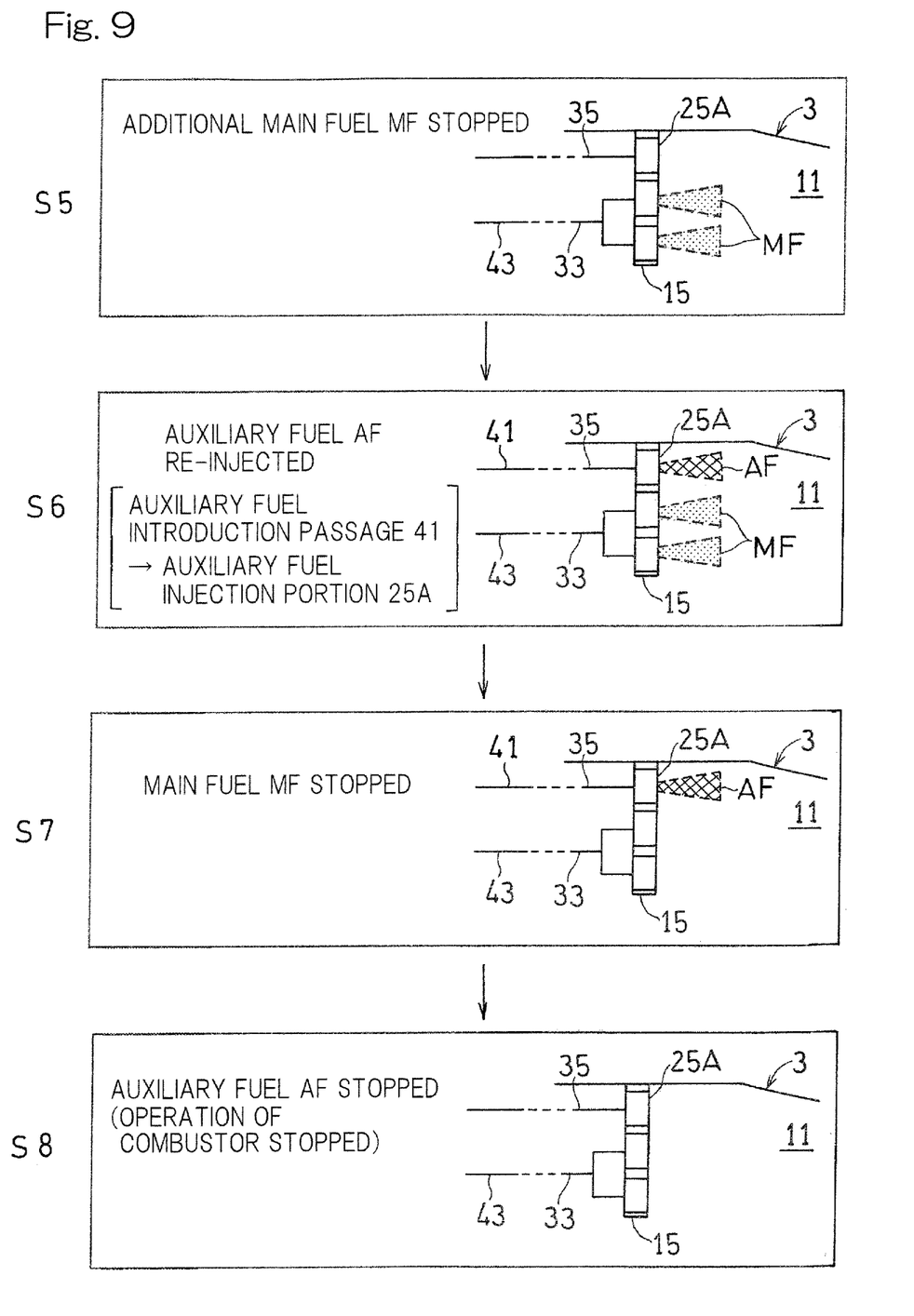
FIG. 9 is a flowchart showing an example of an operating method during stopping of the combustor in FIG. 2.

Next, an operating method for stopping the combustor 3 will be described. First, a method in which, as shown in FIG. 9, the combustor 3 is being stopped when the combustor 3 is operated under a high-load operation state in which the main fuel MF injected from the plurality of annular fuel injection portions 25 into the combustion chamber 11 is being combusted, will be described. In the high-load operation state, the introduction of the main fuel MF from the second main fuel introduction passage 45 to the auxiliary fuel injection portion 25A is stopped (additional main fuel stop step S5). After the additional main fuel stop step S5, the auxiliary fuel AF is injected from the auxiliary fuel introduction passage 41 through the auxiliary fuel injection portion 25A into the combustion chamber 11 (auxiliary fuel reinjection step S6). After the auxiliary fuel AF injected in the auxiliary fuel reinjection step S6 is ignited, the introduction of the main fuel MF from the first main fuel introduction passage 43 is stopped (main fuel stop step S7). After the main fuel stop step S7, the supply of the auxiliary fuel AF from the auxiliary fuel introduction passage 41 is stopped (auxiliary fuel final stop step S8). Accordingly, the operation of the combustor 3 is stopped.

In a low-load operation state in which the main fuel MF is injected only from the main fuel injection portions 25B among the plurality of annular fuel injection portions 25 into the combustion chamber 11 and is being combusted, the operation of the combustor 3 is stopped by steps S6 to S8 excluding the above additional main fuel stop step S5.

The above steps S5 to S8 are a basic procedure for stopping the operation of the combustor 3. During stopping of the combustor 3, the following steps for purging the main fuel MF may be further performed.

After the supply of the main fuel MF from the first main fuel introduction passage 43 is stopped (main fuel stop step S7), the purge gas PG is introduced from the purge gas introduction passage 61 into the first main fuel introduction passage 43 and the second main fuel introduction passage 45 (purge gas introduction step S9). In the present embodiment, the purge gas PG is introduced from the purge gas introduction passage 61 through the main fuel major passage 51 into the first main fuel introduction passage 43 and the second main fuel introduction passage 45. Thereafter, the main fuel MF discharged from the first main fuel introduction passage 43, the second main fuel introduction passage 45, and the first fuel supply passage 33 through the main fuel injection portions 25B into the combustion chamber 11 by the introduction of the purge gas PG is combusted together with the auxiliary fuel AF from the auxiliary fuel introduction passage 41 (remaining main fuel combustion step S10). For example, by measuring the introduction amount (total flow amount) of the purge gas PG at the purge gas introduction passage 61 from the purge gas introduction step S9 to the remaining main fuel combustion step S10, the main fuel MF remaining within the main fuel major passage 51, the first main fuel introduction passage 43, the second main fuel introduction passage 45, and the first fuel supply passage 33 can be completely discharged into the combustion chamber 11.

After the purge gas introduction step S9 and the remaining main fuel combustion step S10, the auxiliary fuel AF may be further introduced from the additional purge gas introduction passage 63 into the first main fuel introduction passage 43 and the second main fuel introduction passage 45 using the additional purge gas introduction passage 63 (additional purge step S11). The purge gas introduction step S9 may be omitted, and the additional purge step S11 may be performed before shifting to the remaining fuel combustion step S10.

The purge gas introduction passage 61 and the additional purge gas introduction passage 63 are provided in the combustor 3, and, in the operating method of the combustor 3, the main fuel passages can be purged, while the main fuel MF is being combusted, by performing steps S9 to S11 for purging the main fuel MF using these passages 61 and 63. Thus, unburned gas of the main fuel having a high reaction rate and a wide combustible concentration range can be prevented from remaining in the combustor 3 after stop of the combustor 3. However, it is not essential to provide those passages 61 and 63 for purge and to perform steps S9 to S11 for purging the main fuel MF.

As described above, with the combustor 3 of the gas turbine and the operating method thereof according to the present embodiment, since fuel is injected in a distributed manner from the fuel injection holes 25a of the plurality of annular fuel injection portions 25, local occurrence of a portion where the temperature is high can be avoided and low-NOx combustion can be achieved even when fuel having high reactivity such as hydrogen gas is used as the main fuel MF. Furthermore, since injection of the auxiliary fuel AF is enabled by connecting the auxiliary fuel introduction passage 41 to a part of the plurality of annular fuel injection portions 25 (the auxiliary fuel injection portion 25B), stable combustion can be achieved even at startup or stop of the combustor 3, at which the combustor 3 is in a low-load state, by supplying fuel having lower reactivity than the main fuel MF such as natural gas as the auxiliary fuel AF. Therefore, stable operation of the combustor and stable engine operation can be maintained while generation of unburned gas and a problem due to generation of unburned gas are suppressed.

In the present embodiment, the can-type combustor 3 has been described as an example, but the above configuration may be applied to other types of combustors, for example, an annular type combustor.

Although the present invention has been described above in connection with the preferred embodiments thereof with reference to the accompanying drawings, numerous additions, changes, or deletions can be made without departing from the gist of the present invention. Accordingly, such additions, changes, or deletions are to be construed as included in the scope of the present invention.

REFERENCE NUMERALS

3 . . . Combustor
11 . . . Combustion chamber
13 . . . Combustion liner
15 . . . Fuel injector
25 . . . Annular fuel injection portion
25A . . . Auxiliary fuel injection portion
25B . . . Main fuel injection portion
35 . . . Second fuel supply passage (common fuel supply passage)
41 . . . Auxiliary fuel introduction passage
43 . . . First main fuel introduction passage
45 . . . Second main fuel introduction passage
51 . . . First flow regulating valve
61 . . . Purge gas introduction passage
63 . . . Additional purge gas introduction passage
AF . . . Auxiliary fuel
MF . . . Main fuel
P . . . Igniter

What is claimed is:

1. A combustor comprising:
a combustion liner forming a combustion chamber therein;
a fuel injector provided at a top portion of the combustion liner, the fuel injector having a plurality of annular fuel injection portions arranged so as to be concentric with each other, each annular fuel injection portion being formed with multiple fuel injection holes arranged in a circumferential direction;
wherein the plurality of annular fuel injection portions comprise:
an auxiliary fuel injection portion, the auxiliary fuel injection portion being supplied fuel from a common fuel supply passage, and the auxiliary fuel injection portion being the radially outermost annular fuel injection portion of the plurality of annular fuel injection portions; and
a main fuel injection portion,
an igniter configured to ignite fuel injected from the fuel injector into the combustion chamber, the igniter being attached to the combustion liner;
an auxiliary fuel introduction passage configured to introduce an auxiliary fuel flow into the auxiliary fuel injection portion via the common fuel supply passage;
a first main fuel introduction passage configured to introduce a first portion of a main fuel flow into the main fuel injection portion, the first main fuel introduction passage being provided with a first flow regulating valve;
a second main fuel introduction passage configured to introduce a second portion of the main fuel flow into the auxiliary fuel injection portion via the common fuel supply passage, the second main fuel introduction passage being provided with a second flow regulating valve,
a purge gas introduction passage configured to introduce a purge gas into the first main fuel introduction passage and the common fuel supply passage via the second main fuel introduction passage; and
an auxiliary fuel purge gas introduction passage branching from the auxiliary fuel introduction passage, the auxiliary fuel purge gas introduction passage configured to introduce the auxiliary fuel as a purge fuel into the first main fuel introduction passage and the second main fuel introduction passage.

2. The combustor as claimed in claim 1, wherein the main fuel is a hydrogen-containing gas, and the auxiliary fuel is a natural gas.

* * * * *